July 24, 1962

D. C. YOUNG 3,046,105

LIQUID FERTILIZERS

Filed July 18, 1960

INVENTOR.
DONALD C. YOUNG
BY
ATTORNEY

July 24, 1962  D. C. YOUNG  3,046,105
LIQUID FERTILIZERS
Filed July 18, 1960  2 Sheets-Sheet 2

SOLUBILITIES OF $(NH_4)_2 SO_4$ AND $(NH_4)_{1.7} H_{1.3} PO_4$ IN WATER, WEIGHT PERCENT

INVENTOR.
DONALD C. YOUNG
BY
ATTORNEY

United States Patent Office 3,046,105
Patented July 24, 1962

3,046,105
LIQUID FERTILIZERS
Donald C. Young, Fullerton, Calif., assignor, by mesne assignments, to Collier Carbon and Chemical Corporation, a corporation of California
Filed July 18, 1960, Ser. No. 43,522
17 Claims. (Cl. 71—51)

This invention relates to liquid fertilizer compositions and in particular relates to liquid fertilizers comprising aqueous solutions of ammonium sulfate, mono-ammonium phosphate, and diammonium phosphate, and liquid fertilizers comprising mixtures of the aforementioned solutions with ammonium nitrate or with ammonium nitrate and potassium chloride.

Because of the ease in handling and use of liquids, aqueous solutions of plant nutrients such as inorganic salts are finding increasing acceptance in the fertilizer industry. For such use, it is important that the aqueous solutions be non-corrosive so as to permit the use of mild steel equipment. It is also important to maintain a high concentration of plant nutrients, e.g., greater than about 20 weight-percent for economical shipment and to avoid the necessity of repeated applications to the soil during the growing season. The concentration of such solution is generally limited by the solubility of the salts at the minimum temperature expected to be encountered in the storage or handling of the solution, generally about 0 to 5° centigrade.

Typical of such liquid fertilizers are aqueous solutions of ammonium phosphates which contain a mixture of the mono- and di-ammonium salts of phosphoric acid in approximately equal mol proportions. Solutions of these salts in the aforementioned proportion can be obtained containing as much as about 36 weight-percent plant nutrients at salting out temperatures as low as 0° C. These phosphate solutions are substantially non-corrosive to ferrous metals and consequently are employed as liquid fertilizers.

Ammonium sulfate, however, is considerably less soluble than the aforementioned mixed ammonium phosphates, and solutions containing a sufficient concentration of ammonium sulfate for use as a fertilizer have a prohibitively high salting out temperature. Additionally, such solutions are also highly corrosive to ferrous metals. As a result, this plant nutrient is marketed and used almost entirely in the solid form.

It is an object of this invention to provide a liquid fertilizer composition which contains dissolved ammonium sulfate and has a sufficiently high concentration of plant nutrients to be used as a liquid fertilizer.

I have found that liquid fertilizers containing ammonium sulfate, and having a sufficiently high content of plant nutrients for use as fertilizers, can be obtained in solutions which also contain mono- and di-ammonium phosphate. The production of such fertilizers is based on my discovery that a greater amount of plant nutrients or salts can be dissolved in solutions containing ammonium sulfate, mono-ammonium phosphate and di-ammonium phosphate than can be dissolved in solutions containing any one or two of the aforementioned salts. This effect, I have observed, depends on the proper ratio of the di- to the mono-ammonium salt in the mixture. In general, for solutions having up to about 20 weight-percent phosphorus expressed as $P_2O_5$, the mixed ammonium phosphates should have an average composition equivalent to:

$$(NH_4)_xH_yPO_4$$

where $x$ is between about 1.35 and about 1.85, and $$x+y=3$$

If it is desired to obtain a greater concentration of $P_2O_5$ in the liquid, $x$ should be no greater than about 1.75. If it is also desired to obtain a non-corrosive mixture, $x$ should be no less than about 1.6. The preferred ammonium phosphate useful in my invention is, therefore, that having a value of $x$ between about 1.6 and about 1.75.

I have also found that aqueous solutions containing an even greater amount of solute or dissolved plant nutrients than the aforementioned can be obtained in solutions which, in addition to the aforedescribed phosphate and sulfate, also contain ammonium nitrate. Thus I have discovered that a greater amount of solute can be dissolved in solutions containing ammonium sulfate, mono-ammonium phosphate, di-ammonium phosphate and ammonium nitrate than can be dissolved in solutions containing any one, two or three of these salts. As with my previously described discovery, this too depends on the proper ratio of the di- to the mono-ammonium salt in the mixture; $x$ being between about 1.35 and about 1.85 and preferably between about 1.6 and about 1.75.

The invention will now be described by reference to the figures, of which:

Figure 1:
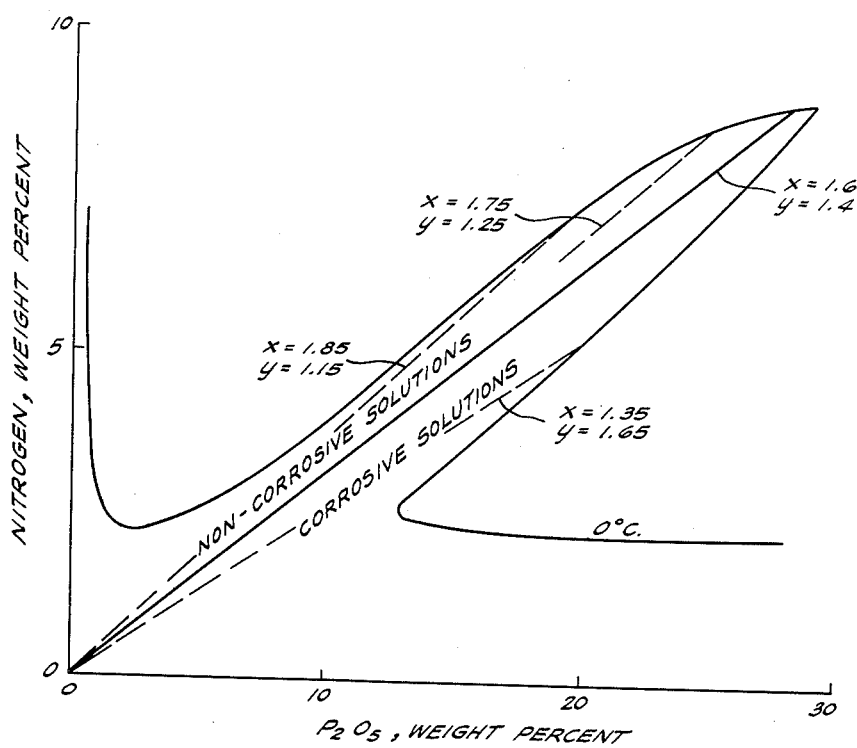
FIGURE 1 shows the solubility isotherm of ammonium phosphates at 0° C.

Referring now to FIGURE 1, the solubility characteristics of mixed ammonium phosphates at 0° C. are shown as a function of the weight-percent of dissolved nitrogen and phosphorus, the phosphorus being calculated as $P_2O_5$. The region beneath and within the isotherm represents liquid solutions, that above and outside the curve represents a mixed solid-liquid system. Straight lines on this plot intersecting the origin represent a fixed ratio of the di- to the mono-ammonium salt. This curve shows that the ratio of nitrogen to $P_2O_5$ is very critical for maximum solubility of the ammonium phosphate salts. From this figure it can be seen that any alteration in the nitrogen to $P_2O_5$ ratio of a solution whose composition is within the protrusion of the isotherm, e.g., by the addition of ammonia, phosphoric acid, di-ammonium phosphate, or mono-ammonium phosphate, will cause the composition to enter a two-phase region where crystallization will occur.

The liquid region of FIGURE 1 is divided into non-corrosive and corrosive zones by a straight line representing liquid compositions containing a mol ratio of the di- to the mono-ammonium phosphate salt of about 1.6. From FIGURE 1, the proportion of di-ammonium to mono-ammonium phosphate salt suitable for use in my invention in combination with ammounium sulfate can be selected. The broad range of compositions of ammonium phosphates are those within the protrusion of the isotherm comprising mixtures of the mono- and di-ammonium salts substantially equivalent to:

$$(NH_4)_{1.35-1.85}H_{1.65-1.15}PO_4$$

For greater $P_2O_5$ content, e.g., between 20 and 25 weight-percent, the mixed ammonium salts should have an average composition of:

$$(NH_4)_{1.46-1.75}H_{1.54-1.25}PO_4$$

Preferably, the compositions employed are non-corrosive to ferrous metals and, therefore, the di-ammonium salt constitutes in excess of 60 mol percent of the salt mixture, with an average composition of:

$$(NH_4)_{1.6-1.75}H_{1.4-1.25}PO_4$$

Figure 2:
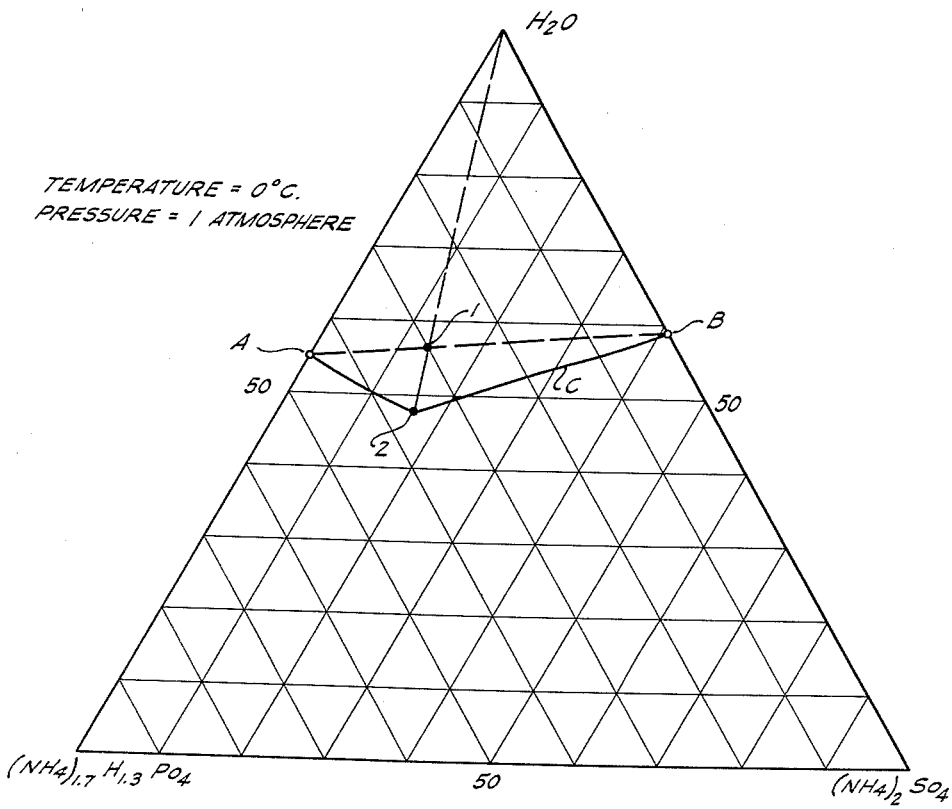
FIGURE 2 shows the system of ammonium phosphate, ammonium sulfate and water at 0° C.

Referring now to FIGURE 2, the solubility characteristics at 0° C. are illustrated of a composition of my invention which contains water, ammonium sulfate and a mixed ammonium salt falling within the preferred range, with $x=1.7$ and $y=1.3$. All proportions are by weight. A saturated solution of this mixed salt is shown at point A, while a saturated solution of ammonium sulfate is shown at point B. I have found that when these saturated solutions are mixed, the resultant mixture has a lower salting out temperature than either of the saturated solutions, and also that for the same salting out temperature, additional amounts of salt can be dissolved in mixtures of the saturated solutions.

This effect is illustrated by the departure of the line C connecting points A and B from a straight line. The effect is quite substantial, as is apparent from a comparison of compositions 1 and 2. Composition 2 contains about 52 weight-percent dissolved salts and is a saturated solution containing di-ammonium phosphate mono-ammonium phosphate and ammonium sulfate. If the mixed solutions behaved ideally such a solution of mixed salts would be expected to be at point 1 containing only 44 weight percent dissolved salts.

That the mixed ammonium phosphate-ammonium sulfate solutions should behave non-ideally is not entirely unexpected, but that the mixed solutions would depart from ideality in favor of greater solubility throughout the entire range of possible mixtures of the sulfate and phosphate salts is completely unexpected. If di-ammonium phosphate is employed rather than the aforedescribed mixtures of di- and mono-ammonium phosphates, the mixed solutions depart from ideality but in the opposite direction, in favor of lesser solubility. This can be demonstrated by adding portions of a saturated solution of ammonium sulfate to a saturated solution of di-ammonium phosphate and observing the crystallization or salting out which occurs. A similar result occurs when portions of a saturated ammonium sulfate solution are added to a saturated solution of mono-ammonium phosphate. Contrary to this, I have observed that when an ammonium phosphate mixture whose composition falls within the protrusion of the isotherm of FIGURE 1 is mixed with ammonium sulfate, the solutizing effect illustrated in FIGURE 2 occurs.

Liquid fertilizers containing even greater contents of solute can be obtained if the solute comprises ammonium nitrate in addition to the aforedescribed ammonium sulfate and mixed ammonium phosphates. I have been able to prepare aqueous solutions containing up to about 55 to 56 weight-percent solute, in which the solute comprises the sulfate, nitrate and phosphate salts of ammonia. This effect is also unexpected since the addition of various other salts to the solute, e.g., potassium chloride, normally results in a markedly decreased solubility of the solute.

These solutizing effects have several important and practical applications. They, of course, provide aqueous solutions with greater plant nutrient content than are possible in saturated solutions of the individual solutes. This effect is substantial, e.g., a comparison of composition 2 (FIGURE 2) with the saturated solution of ammonium phosphates, A, shows that up to about 15.5 percent more solute can be dissolved in ammonium phosphate solutions which also contain ammonium sulfate. A similar comparison of the saturated solution also containing ammonium nitrate with composition 2 shows that up to 7.7 percent more solute can be obtained in aqueous solutions of ammonium phosphate, ammonium sulfate, and ammonium nitrate than in solutions of only ammonium phosphate and ammonium sulfate.

A second and equally important aspect of this invention is that a saturated solution of ammonium phosphates having the aforementioned $x$ and $y$ values can be mixed with saturated solutions of ammonium sulfate or saturated solutions of ammonium sulfate and ammonium nitrate. This permits the dealer or distributor to store the saturated solutions in bulk quantities and custom blend them in any desired proportion to suit the regional or even the individual customer's requirements. This would not be possible with saturated solutions of either the mono- or the di-ammonium phosphate, since addition of a saturated solution of ammonium sulfate or ammonium nitrate to the latter solutions appreciably raises their salting out temperatures.

In addition to the greater solubility of the mixed salts, I have also found that their solutions are substantially non-corrosive over the entire range of compositions provided a non-corrosive ammonium phosphate is chosen, i.e., a salt mixture wherein $x$ is greater than about 1.6. This is entirely unexpected, particularly in the low concentrations of phosphate where even the addition of less than one part of the ammonium phosphate to 100 parts of ammonium sulfate, or mixed ammonium sulfate and nitrate, renders these solutions substantially non-corrosive.

The aqueous fertilizers of my invention can be obtained by numerous methods. To obtain composition 2 of FIGURE 2, for instance, 9.8 pounds of mono-ammonium phosphate, 26.2 pounds of di-ammonium phosphate, 16 pounds of ammonium sulfate and about 5.8 gallons of water can be mixed together simultaneously or in any sequential order. A convenient method is to add ammonium sulfate, alone, or with ammonium nitrate to an aqueous solution of mono- and di-ammonium phosphate with a sufficient amount of water, when necessary, to obtain the desired salting out temperature. As previously mentioned, aqueous solutions of ammonium phosphate having suitable compositions, i.e., where $x$ is between about 1.35 to 1.85 and generally between about 1.6 and 1.75 are commercially available as "6–18–0," "8–24–0," etc. These commercial designations mean that the fertilizer solutions contain 6 to 8 percent nitrogen and 18 to 24 percent phosphorus calculated as $P_2O_5$. These ammonium phosphate solutions can also be obtained from phosphoric acid directly by adding between about 1.35 to 1.85 molecular weights of ammonium per molecular weight of ortho phosphoric acid along with a sufficient amount of water to dilute the salt. This neutralization can be controlled by the pH and density of the product, the proper amount of ammonium and water being added so as to obtain a product having a pH between about 6.0 to 8.5 and a density between about 1.2 to 1.3.

The aqueous fertilizers of my invention can also be obtained by the addition of anhydrous or aqua ammonia and/or water to mixed phosphoric and sulfuric acids or mixed phosphoric, sulfuric and nitric acids. Thus to obtain the composition 2 of FIGURE 2, for instance, 37.3 pounds of phosphoric acid (54% $P_2O_5$) and 12.5 pounds of sulfuric acid (96%) are mixed, and to this mixture is slowly added 12.4 pounds of anhydrous ammonia and 4.5 gallons of water. During the neutralization the temperature should be held below about 200° F. to prevent the loss of ammonia as e.g. by use of cooling coils immersed within the neutralization zone or by recycling a portion of the reactants through an external cooler. This method is particularly advantageous since it permits the utilization of relatively impure spent sulfuric acid previously employed in alkylation, petroleum, refining, etc., as the source of sulfuric acid. Sulfuric acid previously used in alkylation, for example, constitutes a major source of the sulfate fertilizers; however, this acid must ordinarily be at least partially purified before it can be neutralized in the production of solid ammonium sulfate crystals because the impurities interfere with the crystallization of the salt. However in the production of the aqueous sulfate solutions of my invention, such purification would be unnecessary.

The following are typical of liquid fertilizers obtainable by my invention, the proportions being by weight:

| Fertilizer Designation | Salting Out Temperature, °C. | $(NH_4)_{1.7}H_{1.3}PO_4$ | $(NH_4)_2SO_4$ | $NH_4NO_3$ | KCl | Total Solute | Water |
|---|---|---|---|---|---|---|---|
| 5-10-0-2 | <0 | 17.9 | 8.3 | | | 26.2 | 73.8 |
| 8-8-0-6 | <0 | 14.3 | 24.8 | | | 39.1 | 60.9 |
| 9-22-0-2 | <0 | 39.4 | 8.3 | | | 47.7 | 52.3 |
| 9-11-0-6 | <0 | 19.7 | 24.8 | | | 44.5 | 55.5 |
| 6-12-4-2 | 2 | 21.4 | 8.3 | 0.7 | 6.7 | 37.1 | 62.9 |
| 7-11-5-1 | −2 | 19.6 | 4.1 | 7.1 | 8.3 | 39.1 | 70.9 |
| 10-12-3-2 | −1 | 21.4 | 8.3 | 12.1 | 5.0 | 46.8 | 53.2 |
| 12-12-0-5 | 2 | 21.4 | 20.7 | 10.3 | | 52.4 | 47.6 |
| 15-5-0-3 | <0 | 8.9 | 12.4 | 30.6 | | 41.9 | 58.1 |
| 15-8-0-4 | <0 | 14.2 | 16.5 | 24.2 | | 54.9 | 45.1 |

The following examples will demonstrate my invention:

EXAMPLE 1

To determine the solubility characteristics of ammonium sulfate in a solution containing mono- and di-ammonium phosphate, the following procedure was employed:

Ammonium sulfate was added to each of a series of solutions containing between about 4 to 39 weight-percent ammonium phosphate of the following composition:

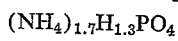

$$(NH_4)_{1.7}H_{1.3}PO_4$$

A sufficient amount of ammonium sulfate was added to reach the saturation point for each of the solutions at 0° C. The solutions were then analyzed for their solute content and the results are shown in FIGURE 2. All the solutions so obtained were substantially non-corrosive to ferrous metals.

EXAMPLE 2

To each of a series of samples of a solution of monoammonium phosphate saturated at 0° C. was added a solution of ammonium sulfate also saturated at 0° C. in volume ratios of the ammonium sulfate solution to the phosphate solution between about 9:1 to 1:9. Upon cooling the resulting solutions to 0° C., a solid crystal phase separated from all the solutions containing between 0 to 23 weight-percent of ammonium sulfate. The experiment was repeated with di-ammonium phosphate and similar crystallization was observed in solutions containing up to about 17 weight-percent ammonium sulfate.

EXAMPLE 3

Sulfuric acid of approximately 92 percent strength which had previously been used in sulfuric acid alkylation plant and consequently contained about 4 to 5 weight-percent organic and other impurities was mixed with phosphoric acid of about 54 percent $P_2O_5$ strength. To the mixed acids was added a sufficient amount of aqueous ammonia to provide two moles of ammonia per mole of sulfuric acid and about 1.7 moles of ammonia per mole of phosphoric acid. The resultant aqueous solution contained 10 weight-percent nitrogen and 20 weight-percent phosphorus calculated as $P_2O_5$ and 4 percent sulfur. The salting out temperature of the solution was 0°C.

EXAMPLE 4

The combined solubility of ammonium nitrate, ammonium sulfate and mixed ammonium phosphates $((NH_4)_{1.7}H_{1.3}PO_4)$ was determined as follows:

To obtain a series of solutions comprising varying amounts of ammonium nitrate and ammonium phosphates, portions of a solution containing 57 weight-percent ammonium nitrate were mixed with portions of a solution containing 42.5 weight-percent of the ammonium phosphates. To each of the resultant solutions, solid ammonium sulfate was added and the solutions were cooled to and held at about 0° centigrade for about 5 hours. The results are shown in Table 1, where it can be seen that the combination of ammonium nitrate with the ammonium phosphate and sulfate solutions previously described provided aqueous solutions which contained a greater amount of dissolved solute than could be obtained in solutions of the single salts or mixtures of any two thereof. This effect is substantial, up to about 7.7 weight-percent more salt being soluble in the combined solution of nitrate, phosphates and sulfate than was possible in the most soluble phosphate and sulfate system.

*Table 1*

| Sample | $(NH_4)_{1.7}H_{1.3}PO_4$ | $(NH_4)_2SO_4$ | $NH_4NO_3$ | Total Solute | Water |
|---|---|---|---|---|---|
| 1 | 6.0 | 11.4 | 37.6 | 55.0 | 45.0 |
| 2 | 9.6 | 14.6 | 30.8 | 55.0 | 45.0 |
| 3 | 13.1 | 18.7 | 24.4 | 56.2 | 43.8 |
| 4 | 18.4 | 19.7 | 15.7 | 53.8 | 46.2 |
| 5 | 23.6 | 23.0 | 5.2 | 51.7 | 48.3 |
| 6 | 37.7 | 17.9 | 32.6 | 54.3 | 45.7 |

EXAMPLE 5

Ammonium sulfate and potassium chloride were added in excess amounts to a solution of 42.5 weight-percent ammonium phosphate of an average composition: $(NH_4)_{1.7}H_{1.3}PO_4$. The resultant system was held at 0° centigrade for 5 hours and thereafter the aqueous phase was withdrawn and analyzed.

The analysis shows the following:

|  | Weight-percent |
|---|---|
| KCl | 5.4 |
| $(NH_4)_{1.7}H_{1.3}PO_4$ | 23.4 |
| $(NH_4)_2SO_4$ | 8.7 |
| Water | 62.5 |

A comparison of the preceding with sample 5 of Example 4 shows that the addition of potassium chloride rather than ammonium nitrate to the ammonium phosphate-ammonium sulfate system greatly reduces the total solubility of the salts, from 51.7 to 37.5 weight-percent, and reduces the ammonium sulfate solubility from 23.0 to 8.7 weight percent.

EXAMPLE 6

Ammonium sulfate and potassium chloride were added in excess to a solution containing 57.0 weight-percent ammonium nitrate and the system was held at 0° centigrade for five hours. Thereafter the aqueous phase was removed and found to consist of:

|  | Weight-percent |
|---|---|
| KCl | 6.2 |
| $(NH_4)_2SO_4$ | 12.9 |
| $NH_4NO_3$ | 12.8 |
| Water | 68.1 |

A comparison of the preceding with sample 1 of Example 4 shows that addition of potassium chloride rather than ammonium phosphate to the ammonium nitrate-ammonium sulfate system greatly reduces the total solute solubility from 55.0 to 31.9 weight-percent, and reduces the ammonium nitrate solubility from 37.6 to 12.8 weight-percent.

EXAMPLE 6

Despite the depressing effect that potassium chloride has on the aforedescribed ammonium sulfate-ammonium nitrate and ammonium sulfate-ammonium phosphate solutions, I have found that potassium chloride can be dissolved in aqueous solutions which consist of relatively large amounts of ammonium sulfate, ammonium phosphate and ammonium nitrate. This was demonstrated by adding potassium chloride to an excess to a saturated solution of ammonium phosphates, ammonium sulfate and ammonium nitrate. The following resultant aqueous solution was obtained:

| | Weight-percent |
|---|---|
| KCl | 5.5 |
| $(NH_4)_{1.7}H_{1.3}PO_4$ | 23.0 |
| $(NH_4)_2SO_4$ | 8.9 |
| $NH_4NO_3$ | 10.0 |
| Water | 52.6 |

A comparison of this solution with that obtained in Example 5 shows that up to 10 weight-percent ammonium nitrate can be dissolved in a solution saturated with ammonium phosphates, ammonium sulfate and potassium chloride to achieve 47.4 weight-percent solute.

As shown by the preceding examples, aqueous solutions of ammonium sulfate can be obtained which contain a sufficiently high content of plant nutrients to be economical for shipment and use as aqueous solutions. One class of these solutions comprises mixtures of ammonium sulfate with ammonium phosphates having the average composition of:

$$(NH_4)_xH_yPO_4$$

where $x+y=3$, and $x$ is between about 1.35 and about 1.85; and preferably $x$ is between about 1.6 and about 1.75.

A second class of solutions useful as liquid fertilizers comprise mixtures of ammonium sulfate, the aforementioned ammonium nitrate, wherein aqueous solutions containing up to about 55 to 56 weight-percent of dissolved salts can be obtained with salting out temperatures as low as 0° centigrade.

A third class of solutions useful as liquid fertilizers comprise mixtures of ammonium sulfate, the aforedescribed ammonium phosphates, ammonium nitrate and potassium chloride, where solutions containing up to about 47.5 weight-percent solute can be obtained with salting out temperatures of about 0° centigrade.

Additionally, I have discovered that all the aforedescribed solutions are substantially non-corrosive to ferrous metals when $x$ is greater than about 1.6.

These solutions are suitable for application to the soil as liquids in their highly concentrated form, or diluted to whatever strength desired. As previously mentioned, my invention permits a distributor or dealer to custom blend aqueous compositions to meet any particular local requirement. Another use of these solutions is in the production of solid granular fertilizers. These fertilizers are generally made by neutralizing phosphoric acid with ammonia to produce a granular solid. Solid ammonium sulfate crystals are commonly added to the granulator to obtain a product of mixed ingredients. In lieu of crystalline ammonium sulfate, the aqueous solutions of my invention can be added to the granulator. This would be advantageous in the process because relatively impure alkylation or refining sulfuric acid could be employed without requiring purification of the acid as required in the production of the crystalline ammonium sulfate.

I claim:
1. An aqueous solution containing at least 41 weight percent of a mixture of dissolved salts, said mixture consisting of ammonium sulfate and ammonium phosphate of the average composition:

$$(NH_4)_xH_yPO_4$$

where $x+y=3$, and $x$ is between about 1.35 and about 1.85.

2. A solution of claim 1 which is substantially non-corrosive to ferrous metals wherein $x$ is between about 1.6 and about 1.85.

3. The composition of claim 1 wherein said solution contains greater than about 41 percent dissolved solids and has a salting out temperature no greater than about 0° C.

4. An aqueous solution containing at least 41 weight percent of a mixture of dissolved salts, said mixture consisting of ammonium phosphate and ammonium sulfate represented by a point lying within the area on the trilinear plot of the ammonium phosphate, ammonium sulfate and water system at 0° centigrade, said area being defined by a straight line connecting the point representing the saturated solution of ammonium phosphate to the point representing the saturated solution of ammonium sulfate and the solubility isotherm for said system, wherein said ammonium phosphate has the following average composition:

$$(NH_4)_xH_yPO_4$$

where $x+y=3$, and $x$ is between about 1.35 and about 1.85.

5. A solution of claim 4 which is substantially non-corrosive to ferrous metals wherein $x$ is between about 1.6 and about 1.85.

6. An aqueous solution of ammonium phosphate and ammonium sulfate lying within the area defined by lines A–1–B and A–2–B of attached FIGURE 2, wherein the ammonium phosphate of said solution has the average composition of:

$$(NH_4)_xH_yPO_4$$

where $x+y=3$, and $x$ is between about 1.35 and about 1.85.

7. A solution of claim 6 which is substantially non-corrosive to ferrous metals wherein $x$ is between about 1.6 and about 1.85.

8. An aqueous solution containing at least 41 weight percent of a mixture of dissolved salts, said mixture consisting of ammonium sulfate, ammonium nitrate and mixed ammonium phosphates of the average composition:

$$(NH_4)_xH_yPO_4$$

where $x+y=3$, and $x$ is between about 1.35 and about 1.85.

9. A solution of claim 8 which is substantially non-corrosive to ferrous metals wherein $x$ is between about 1.6 and about 1.85.

10. A composition of claim 8 which also contains potassium chloride.

11. A composition as defined by claim 8 which contains between about 50 and 56 weight-percent dissolved salts, and has a salting out temperature no greater than about 0° centigrade.

12. A liquid fertilizer having a salting out temperature of about 0° to about 5° centigrade comprising an aqueous solution of dissolved salts, said dissolved salts comprising between about 46 and about 52 weight percent of said solution and consisting of between about 4 and about 42 weight-percent ammonium phosphates and between about 4 and about 38 weight-percent ammonium sulfate, said ammonium phosphates having an average composition of:

$$(NH_4)_xH_yPO_4$$

where $x+y=3$, and $x$ is between about 1.35 and about 1.85.

13. A liquid fertilizer of claim 12 which is substantially non-corrosive to ferrous metals wherein $x$ is between about 1.6 and about 1.85.

14. A liquid fertilizer having a salting out temperature about 0° to 5° centigrade, comprising an aqueous solution of between about 45 to 48 weight-percent total dissolved salts consisting of between about 6 to 16 weight-percent ammonium sulfate, between about 8 to 16 weight-percent ammonium nitrate, between about 2 to 6 weight-percent potassium chloride and between about 18 to 28 weight-percent ammonium phosphates of the following average composition:

$$(NH_4)_xH_yPO_4$$

where $x+y=3$, and $x$ is between about 1.35 and about 1.85.

15. A liquid fertilizer of claim 14 which is substantially non-corrosive to ferrous metals wherein $x$ is between about 1.6 and about 1.85.

16. A liquid fertilizer having a salting out temperature about 0° to 5° centigrade, comprising an aqueous solution of between about 45 to 58 weight-percent dissolved salts consisting of between about 5 to 40 weight-percent ammonium nitrate, between about 5 to 25 weight-percent ammonium sulfate and between about 5 to 45 weight-percent ammonium phosphate having the following average composition:

$$(NH_4)_x H_y PO_4$$

where $x+y=3$, and
$x$ is between about 1.35 and about 1.85.

17. A liquid fertilizer of claim 16 which is substantially non-corrosive to ferrous metals wherein $x$ is between about 1.6 and about 1.85.

References Cited in the file of this patent
UNITED STATES PATENTS

| | | |
|---|---|---|
| 2,814,556 | Christoffel | Nov. 26, 1957 |
| 2,919,183 | Christoffel | Dec. 29, 1959 |

FOREIGN PATENTS

| | | |
|---|---|---|
| 302,148 | Great Britain | Aug. 15, 1929 |
| 396,092 | Great Britain | July 27, 1933 |